United States Patent [19]

Kobold

[11] Patent Number: 4,938,078
[45] Date of Patent: Jul. 3, 1990

[54] METHOD AND APPARATUS FOR MEASURING FLOW RATE

[76] Inventor: Klaus Kobold, Nordring 22-24, 6238 Hofheim/Ts, Fed. Rep. of Germany

[21] Appl. No.: 222,826

[22] Filed: Jul. 22, 1988

[30] Foreign Application Priority Data

Jul. 22, 1987 [DE] Fed. Rep. of Germany ....... 3724179

[51] Int. Cl.⁵ .............................................. G01F 1/28
[52] U.S. Cl. .................................................. 73/861.71
[58] Field of Search ............ 73/861.61, 861.71, 861.62

[56] References Cited

U.S. PATENT DOCUMENTS

| | | | |
|---|---|---|---|
| 1,699,163 | 1/1929 | Schiske | 73/861.71 |
| 3,766,779 | 10/1973 | Hoffman | 73/861.71 |
| 3,835,885 | 9/1974 | Kreyenberg | 73/861.71 X |
| 4,166,936 | 9/1979 | Tice | 73/861.71 X |
| 4,573,361 | 3/1986 | Kobold | 73/861.71 |

FOREIGN PATENT DOCUMENTS 2135784 9/1984 United Kingdom .

*Primary Examiner*—Herbert Goldstein
*Attorney, Agent, or Firm*—Wenderoth, Lind & Ponack

[57] ABSTRACT

A method and apparatus for measuring flow rate. A flow meter has a cylindrical interior with a substantially constant diameter over its full length, through which the fluid medium to be measured flows. A float element is movably mounted in a sealing manner within the interior of the housing. The flow of the fluid medium creates a force on the float which is preferably opposed by a spring with a progressive force charateristic. The float element includes a hollow cylinder forming an inner axial flow channel. The fluid medium flow is restricted by an orifice plate having an essentially circular orifice with a diameter considerably smaller than that of the hollow cylinder. The orifice plate is held in the hollow cylinder in a manner which allows replacement with another orifice plate having a different orifice. The particular orifice plate used is determined by the range of viscosity of the fluid to be measured. Starting from a lower limit of about 1 cSt. upward, the ratio of orifice plate thickness to orifice diameter increases with the upper limit of the viscosity range of the fluid, but remains between about 0.05 and 1.0.

23 Claims, 1 Drawing Sheet

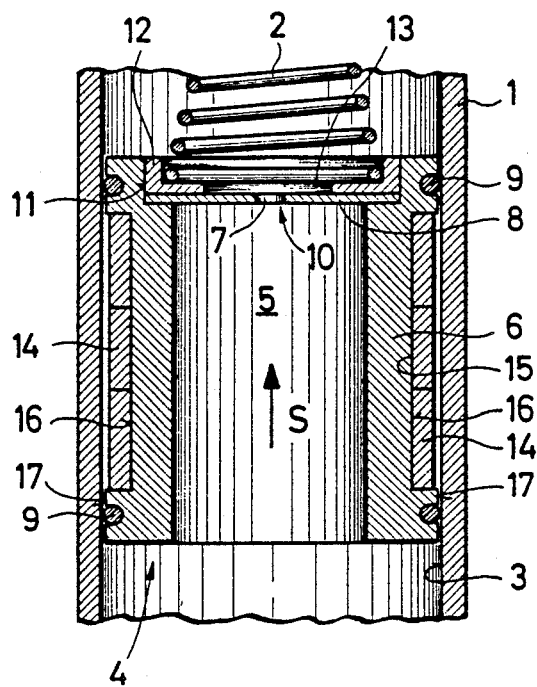

METHOD AND APPARATUS FOR MEASURING FLOW RATE

FIELD OF THE INVENTION

The present invention relates to a process and apparatus for measuring the rate of flow of a liquid, and in particular where the measurement is effected by observation of the movement of a resistance body within the flow.

DESCRIPTION OF THE RELATED ART

One type of known volume flow meter for measuring and monitoring the flow of a fluid works according to the floater principle. In these devices the flow resistance which occurs during the flow around and/or through a floater located in a measuring tube effects a shifting of the floater within the measuring tube. As the flow resistance is volume dependent, the shifting of the floater in the measuring tube is a measure of volume flow. In these so-called floater measuring devices the weight of the floater, reduced by its buoyancy, reaches an equilibrium with the force resulting from the flow resistance. In order to obtain an assignment between floater position and volume flow, the interior of the measuring tube is conically-shaped. With special additional shaping of the measuring tube it is possible to obtain a linear indicator and a large measuring range. However, this type of device must be installed vertically. In addition, they are very viscosity dependent. However, with a spring loading of the resistance body it is possible to obtain an installation independent of gravity. A large number of known volume flow meters that work according to the principle of the resistance body use a surface expansion with increasing the volume flow, in order to have a sufficiently large measuring range available. Constructively, this expansion is realized by designing the measuring cross-section as an annular gap. However, the flow resistance affected by flowing through an annular gap is not independent of viscosity, particularly with a low rate of flow. Thus, even with devices of this type, which have been developed with a view to an essential independence from viscosity, there may be up to 500% deviation in the indicator during low rate of flow of highly viscous oils, as compared to the values with similar rate of flow of water.

Other types of volume flow meters which work according to the displacement principle, e.g., oval wheel counters, are not viscosity dependent, however, they are complicated and thus expensive. In addition, the volume rate of flow can only be obtained by additional measured value processing, as the displacement meters themselves only integrate rate of flow over time. It has so far not been possible to obtain inexpensive measuring and monitoring with these types of flow meters.

In flow meters of the type addressed by the present invention, a resistance body runs with a very tight fit in the guide housing. An annular gap between the resistance body and the guide housing is avoided. In this manner, the total measuring flow is led through a hole in a pin diaphragm of the resistance body. As the hole diameter is small in comparison to the inside diameter of the resistance body, the flow resistance in the inner part of the resistance body is negligible compared to the flow resistance resulting from the rate of flow through the pin diaphragm. The force of flow on the resistance body is thus created practically in its entirety by the pressure loss in the pin diaphragm. If the flow meter is to be used independent of gravity, a spring works against the resistance body, which spring is preferably equipped with a progressive force characteristic in order to provide a sufficient measuring range for practical application with a corresponding resolution in the measurement indicator. The spring used may be a cone-shaped spring. The spring is arranged in such a manner that a linear dependence between the position of the resistance body and the volume rate of flow is attained. The spring may be connected to the housing at one end and at the other end to the resistance body. The resistance body may also be equipped with permanent magnets which operate a potential-free reed switch, which is arranged outside of the housing so that a hermetic separation between the fluid medium and the electrical contact device is attained.

From DE-OS No. 29 46 826 a flow monitor for liquid or gaseous media is known which consists of a housing that can be switched into the flow path of the respective medium, a resistance body, shiftable in the housing from a given rest position against the force of a pre-stressed spring in dependence on the rate of flow, and at least one evaluation device arranged outside of the housing. The movable resistance body has the shape of a flat screen with at least one opening and is held by the spring at a distance to the interior wall of the housing. This is supposed to have the effect that, even with impurities in the medium, e.g., additives, there is no jamming or tilting of the resistance body and, a perfect performance is assured even with greatly varying viscosity values for the medium. In other words, compared to known devices, considerably better properties are assured with regard to the switching hysteresis between the switch-on and switch-off points of the evaluation device, as well as with regard to pressure loss at higher rates of flow. Preferably the thickness of the resistance body is supposed to be small compared to its diameter. With this type of flow monitor it is not possible to reliably obtain a viscosity independent measurement with sufficient measurement accuracy, particularly at low flow rates.

The same applies for the flow meter according to U.S. Pat. No. 3,766,779, where it is suggested, among other things, to use pin diaphragms with various configurations and hole sizes for varying viscosities. However, which pin diaphragms are supposed to be used for which viscosity ranges is not disclosed.

SUMMARY OF THE INVENTION

It is an object of the present invention to provide a procedure for measuring the flow rate of a liquid media with the aid of a flow meter and a flow meter for the execution of such a procedure. It is a further object to provide such a procedure and apparatus which has a high degree of accuracy and sensitivity, yet minimizes the influence of viscosity, particularly temperature dependent viscosity changes, especially at low flow rates.

These objects are achieved by a flow meter with a housing having a cylindrical interior with a substantially constant diameter over its full length, through which the fluid medium to be measured flows. A float element is movably mounted in a sealing manner within the interior of the housing. The flow of the fluid medium creates a force on the float which is preferably opposed by a spring with a progressive force characteristic. The float element includes a hollow cylinder forming an inner axial flow channel. The fluid medium flow is restricted by an orifice plate having an essentially circular orifice with a diameter considerably smaller than that of the hollow cylinder. The orifice plate is held in the hollow cylinder in a manner which allows replacement with another orifice plate having a different orifice. The particular orifice plate used is determined by the range of viscosity of the fluid to be measured. Starting from a lower limit of about 1 cSt. upward, the ratio of orifice plate thickness to orifice diameter increases with the viscosity range of the fluid, but remains between about 0.05 and 1.0.

The current invention thus not only refers to a procedure for measuring the rate of flow of fluid media by means of a flow meter, but also to the flow meter itself and its structural details, as they are further explained in the description below.

BRIEF DESCRIPTION OF THE DRAWINGS

Further aims, characteristics, advantages and applications of the present invention can be seen from the description below taken in conjunction with the drawing wherein:

The single FIGURE is a vertical cross-section of the float element and housing of the invention.

DETAILED DESCRIPTION OF THE INVENTION

The flow meter has a vertical housing 1 with a cylindrical interior through which the fluid medium to be measured flows from bottom to top in the direction of the arrow S. The inside diameter of the housing 1 remains essentially constant for its full length. A float element 4 is movably mounted in a sealing manner in the housing 1. The float element 4 includes a hollow cylinder 6 which forms an inner axial flow channel 5. The fluid medium flow is restricted by an orifice plate 8 having an orifice 7. The diameter of the orifice 7 is considerably smaller than the diameter of the flow channel 5, therefore the flow resistance of the float element 4 is due almost exclusively to the orifice plate 8. The diameter of the orifice 7 remains unchanged during the axial movement of the float element 4 in the housing 1.

Because the orifice plate 8 restricts the flow of the fluid medium, the flow creates a force on the float element 4 which tends to move the float element in the direction of the flow (the direction of the arrow S in the FIGURE). The movement of the float element 4 in this direction is preferably opposed by a spring 2. The spring 2 may be a conical spring with a progressive force characteristic.

The float element 4 is guided on an inside wall surface 3 of the housing 1 by at least two O-rings 9 arranged in the outer circumference of, and axially spaced on, the float element 4. O-rings 9 provide a seal against the inside wall surface 3 of housing 1, so the fluid medium flows exclusively through the orifice 7 of the orifice plate 8. The O-rings 9 prevent tilting with little friction resistance. In addition, thermal expansion differences between the housing and the float element 4 or its parts are absorbed. The O-rings 9 also have a cleaning effect on the inside wall surface 3 of the housing. Preferably, the O-rings 9 are separated by an axial distance which corresponds at least to half the diameter of the float element 4.

The orifice plate 8 has a circular periphery and is replaceably held in a recess 11 of the hollow cylinder 6, preferably by friction. It may additionally be held in the recess 11 by a fitting ring 12, which is also preferably held by friction. If the fitting ring 12 is used, the opening 13 of the fitting ring 12 forms the smallest diameter of the flow channel 5 of the cylinder 6. However, as this diameter is still considerably greater than the diameter of the orifice 7 in the orifice plate 8, the fitting ring 12 does not appreciably contribute to the flow resistance of the float element 4.

According to the present invention, if the viscosity of the fluid medium being measured changes significantly, or if a different fluid medium having a significantly different viscosity is to be measured, it is necessary to replace the current orifice plate with a new orifice plate having a ratio of orifice plate thickness to orifice diameter which will minimize the effect of the fluid medium viscosity on the flow measurement. For example, for a viscosity within the range of approximately 1 to 200 cSt., the ratio of orifice plate thickness to orifice diameter should be approximately 0.5. When the viscosity of the fluid medium to be measured has a viscosity within the range of approximately 1 to 1000 cSt., is is preferable to use a ratio of orifice plate thickness to orifice diameter of approximately 0.7. Should the fluid media have a viscosity within the range of approximately 1 to 2500 cSt., a ratio of orifice plate thickness to orifice diameter of approximately 1 is used. For viscosity ranges between the viscosity ranges cited above, the ratio between orifice plate thickness and orifice diameter is interpolated between the cited values.

For simplicity of design, the orifice plate may have an essentially constant thickness so as to form a flat screen.

In any case, the thickness of the orifice plate in the area of the orifice should be between approximately 0.05 mm and 5 mm.

For good results, the ratio between the orifice diameter and the inside diameter of the housing should be between approximately 0.02 and 0.3.

It also has an advantageous effect on accuracy if an orifice plate is used in which the orifice edge 10 is rounded in a semicircle and the smallest diameter of the orifice is that which is used in the ratio.

It is thus suggested by the invention that for increasing the maximum flow rate to be recorded, the orifice diameter as well as the orifice plate thickness must increase to maintain the ratio. This means that a greater maximum flow rate can be measured with sufficient accuracy independent of viscosity, by replacing the orifice plate with one having an orifice diameter and orifice plate thickness greater than the formerly used orifice plate.

The flow meter is further improved when in or around the hollow cylinder 6 one or several preferably axially magnetized magnetic rings 14 are arranged. The hollow cylinder 6 has in its outer wall surface 17 a recess 16 in which three of the axially magnetized magnetic rings 14 are arranged adjoining each other between the two O-rings 9. The magnetic rings 14 are spaced a slight distance from the inside wall surface 3 of the guide housing 1 so as not to contribute to the friction of the float element 4 against the inside wall surface 3 of the housing 1. The inside diameters of the magnetic rings 14 substantially exceed the hole diameter of the pin diaphragm and as such will not substantially add to the flow resistance, but will serve to operate a potential-free reed switch mounted to the outside of the housing. By being held in the recess 16, the magnetic rings 14 would pass close to the reed switch mounted on the outside of the housing. It is possible for the magnetic rings 14, if they are adjoining, to form a substantial part of the length of the float element, so that with an upper stop additionally arranged in the housing, an electro-optical signal device is always turned on above a pre-set flow rate value and is only turned off when the flow rate drops below a pre-set value. It is also possible for the orifice plate to be constructed as a magnetic disc, preferably axially magnetized.

What is claimed is:

1. A process for measuring the flow rate of a fluid, comprising the steps of:
   providing a housing for the fluid to flow through;
   providing a cylinder within said housing for movement in a sealing manner, said cylinder having an inner axial flow channel;
   providing an orifice plate having an orifice, said orifice having a predetermined diameter d and thickness t, said diameter d defining a cross-sectional area substantially smaller than that of said axial flow channel and said orifice defining a ratio $V=t/d$, the value of said ratio V for said orifice plate being determined according to a function of the upper limit of the range of viscosity of the fluid, where said ratio V increased with an increase of the upper limit of the range of viscosity of the fluid, the value of said ratio V being approximately 0.5 when the fluid has a viscosity within the range of approximately 1 to 200 cSt., approximately 0.7 when the fluid has a viscosity within the range of approximately 1 to 1000 cSt. and approximately 1.0 when the fluid has a viscosity within the range of approximately 1 to 2500 cSt;
   mounting said orifice plate on said cylinder to extend across said axial flow channel;
   flowing the fluid through said housing and therefore through said axial flow channel and said orifice; and
   indicating the position of said cylinder within said housing.

2. A process as in claim 1, wherein said step of providing an orifice plate further comprises providing a plurality of said orifice plates, each of said orifice plates having a different value for said ratio V and/or said diameter d, prior to said step of mounting said orifice plate on said cylinder.

3. A process as in claim 1, wherein said step of providing a housing further comprises providing said housing with a substantially cylindrical interior, and said step of providing a cylinder further comprises providing said cylinder with at least two O-rings arranged in the outer circumference of, and axially spaced along, said cylinder for contacting said cylindrical interior of said housing.

4. A process as in claim 3, wherein said step of providing said orifice plate further comprises maintaining a ratio of said orifice diameter d to the diameter of said substantially cylindrical interior within the range of approximately 0.02 to 0.3.

5. A process according to claim 4, wherein said step of providing said orifice plate further comprises providing the peripheral edge of said orifice with a semi-circular cross-section said diameter d corresponding to the smallest diameter of said orifice.

6. A process as in claim 1, wherein said step of providing said orifice plate further comprises maintaining said thickness t of said orifice within the range of 0.05 to 5 mm.

7. A process as in claim 6, wherein said step of providing said orifice plate further comprises maintaining said thickness t substantially constant over the entirety of said orifice plate.

8. A process as in claim 1, wherein said step of providing a cylinder further comprises providing said cylinder with recess means at one end thereof, said step of mounting said orifice plate further comprising inserting said orifice plate in said recess means with a friction fit.

9. A process as in claim 8, wherein said step of mounting said orifice plate further comprises inserting a fitting ring in said recess means with a friction fit subsequent to said insertion of said orifice plate in said recess means.

10. A method as in claim 1, wherein said step of providing a cylinder further comprises providing said cylinder with at least one magnetic ring concentrically mounted on the outer periphery of said cylinder.

11. A method as in claim 10, wherein said step of providing a cylinder further comprises mounting said at least one magnetic ring in a circumferential groove in the outer periphery of said cylinder, said at least one magnetic ring being radially spaced from a substantially cylindrical interior of said housing.

12. A process as in claim 1, wherein said step of providing an orifice plate further comprises forming said orifice plate as an axially magnetized magnet.

13. A device for measuring the flow rate of a fluid, comprising;
    a housing for the fluid to flow through;
    a cylinder movably mounted in a sealing manner within said housing, said cylinder having an inner axial flow channel; and
    an orifice plate mounted in said cylinder in said axial flow channel, said orifice plate having an orifice, said orifice having predetermined diameter d defining a cross-sectional area substantially smaller than that of said axial flow channel, said orifice having a predetermined thickness t, said orifice thereby defining a ratio $V=t/d$, wherein the value of said ratio V being determined according to a function of the upper limit of the range of viscosity of the fluid, where the value of said ratio V increases with an increase of the upper limit of the range of viscosity of the fluid, and the value of said ratio V being approximately 0.5 when the fluid has a viscosity within the range of approximately 1 to 200 cSt., approximately 0.7 when the fluid has a viscosity within the range of approximately 1 to 1000 cSt. and approximately 1.0 when the fluid has a viscosity within the range of approximately 1 to 2500 cSt.

14. A device as in claim 13, wherein said housing includes a substantially cylindrical interior and said cylinder has at least two O-rings arranged in the outer circumference of, and axially spaced along, said cylinder and in contact with said cylindrical interior of said housing.

15. A device as in claim 14, wherein a ratio of said orifice diameter d to the diameter of said substantially cylindrical interior being within the range of approximately 0.02 to 0.3.

16. A device as in claim 15, wherein said orifice has a peripheral edge with a semi-circular cross-section and said diameter d corresponds to the smallest diameter of said orifice.

17. A device as in claim 13, wherein said thickness t is within the range of 0.05 to 5 mm.

18. A device as in claim 17, wherein said thickness t is substantially constant over the entirety of said orifice plate.

19. A device as in claim 13, wherein said cylinder includes recess means at one end thereof, and said orifice plate is mounted in said recess means with a friction fit.

20. A device as in claim 19, further comprising a fitting ring mounted in said recess means for retaining said orifice plate.

21. A device as in claim 13, further comprising at least one magnetic ring concentrically mounted on the outer periphery of said cylinder.

22. A device as in claim 21, wherein said at least one magnetic ring is mounted in a circumferential groove in the outer periphery of said cylinder, and said at least one magnetic ring is radially spaced from a cylindrical interior of said housing.

23. A device as in claim 13, wherein said orifice plate is axially magnetized.

* * * * *